United States Patent [19]

van der Lely

[11] 4,157,004
[45] Jun. 5, 1979

[54] MOWING MACHINES

[76] Inventor: Cornelis van der Lely, 7, Brüschenrain, Zug, Switzerland

[21] Appl. No.: 722,508

[22] Filed: Sep. 13, 1976

[30] Foreign Application Priority Data

Sep. 11, 1975 [NL] Netherlands ............ 7510687

[51] Int. Cl.² ........................................... A01D 55/22
[52] U.S. Cl. ....................................... 56/13.6; 56/295
[58] Field of Search ................ 56/295, 6, 13.5, 13.6, 56/192

[56] References Cited

U.S. PATENT DOCUMENTS

| 119,640 | 10/1871 | Polson | 56/295 |
|---|---|---|---|
| 604,413 | 5/1898 | Palm | 56/295 |
| 3,972,159 | 8/1976 | Oosterling | 56/192 |

Primary Examiner—Russell R. Kinsey
Attorney, Agent, or Firm—Penrose Lucas Albright; William B. Mason

[57] ABSTRACT

A mowing machine is connectable to a tractor's lifting hitch and power take-off. A row of rotors is mounted along the length of a laterally extending support that includes an elongated supporting plate pivoted to the main frame. The supporting plate can be an integral plate profiled to have an upwardly extending front and a channel section. Each rotor includes an upwardly extending shaft splined to a gear positioned beneath a hub and a cutting member. The drive to each rotor can be meshed gear wheels readily removable and replaceable as a unit or an elongated driving shaft housed in the channel section. The unit enclosed gear box can house all of the gear wheels or individual gear boxes can be fixed to the supporting plate. The cutting members can be then one or two blades or wires per rotor that are freely pivotable about upwardly extending axes located a substantial distance from the respective shafts which define the axes of rotation of the rotors. The rotors having one cutting member can be balanced by weights on the hubs so that a high rate of rotor rotation is achieved, the cutting members of neighboring rotors positioned to overlap one another. Neighboring rotors can be driven in the same or relative opposite directions and quick release fastenings secure the hubs to their respective shafts.

41 Claims, 17 Drawing Figures

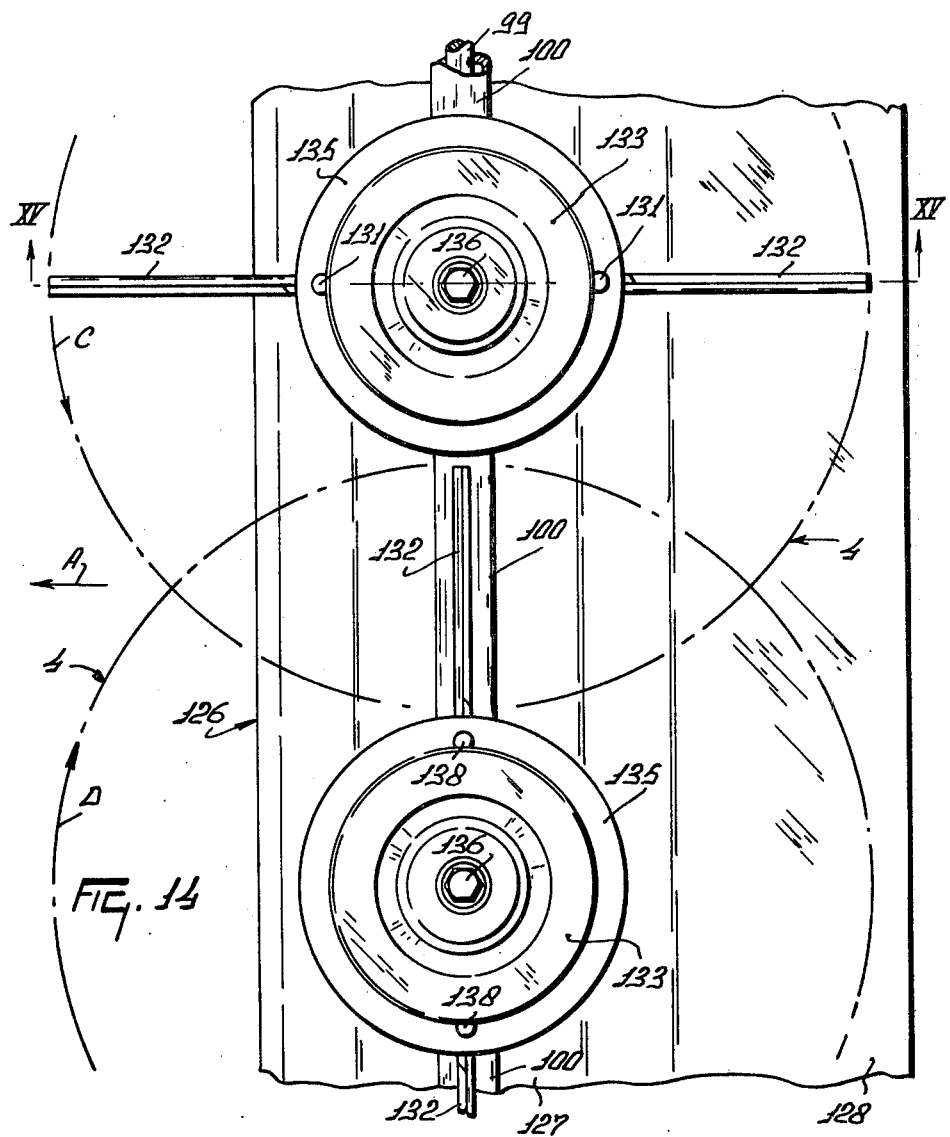
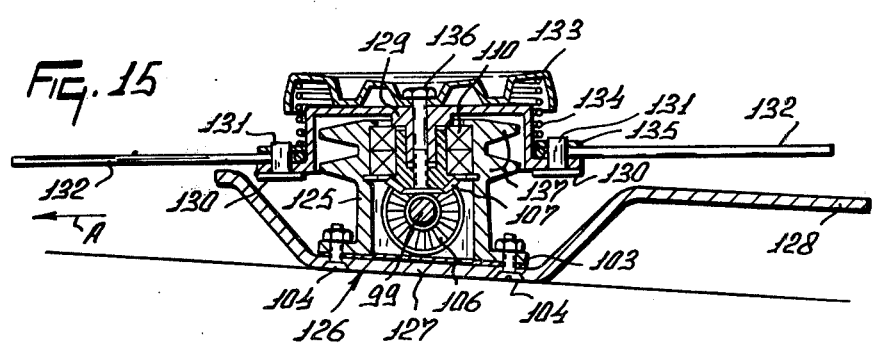

MOWING MACHINES

SUMMARY OF THE INVENTION

The invention relates to mowing machines of the type which have a plurality of rotors which are provided with corresponding cutting members or blades, the rotors being arranged near to each other and driven from beneath by at least one driving gear assembly or transmission. An important object of the instant invention is to provide a relatively inexpensive but efficient mowing machine which is uncomplicated in construction.

According to one aspect of the invention, there is provided a mowing machine of the kind set forth, wherein the rotors are arranged on a mounting plate which is bent over upwardly at its front, with respect to the intended direction of operative travel of the machine, and which is movable over the ground, the driving gear or transmission covering the mounting plate at least locally.

For a better understanding of the invention, and to show how the same may be carried into effect, reference will now be made, by way of example, to the accompanying drawings, in which:

BRIEF DESCRIPTION OF THE DRAWINGS

FIG. 9 is a plan view, similar to FIGS. 5 and 7, which illustrates a third embodiment of part of the mowing machine, FIG. 10 is a section taken on a line X—X in FIG. 9, FIG. 14 is a plan view, similar to FIGS. 5, 7, 9 and 12, which illustrates a fifth embodiment of part of the mowing machine, FIG. 15 is a section taken on a line XV—XV in FIG. 14.

DESCRIPTION OF THE PREFERRED EMBODIMENT

Figure 1:
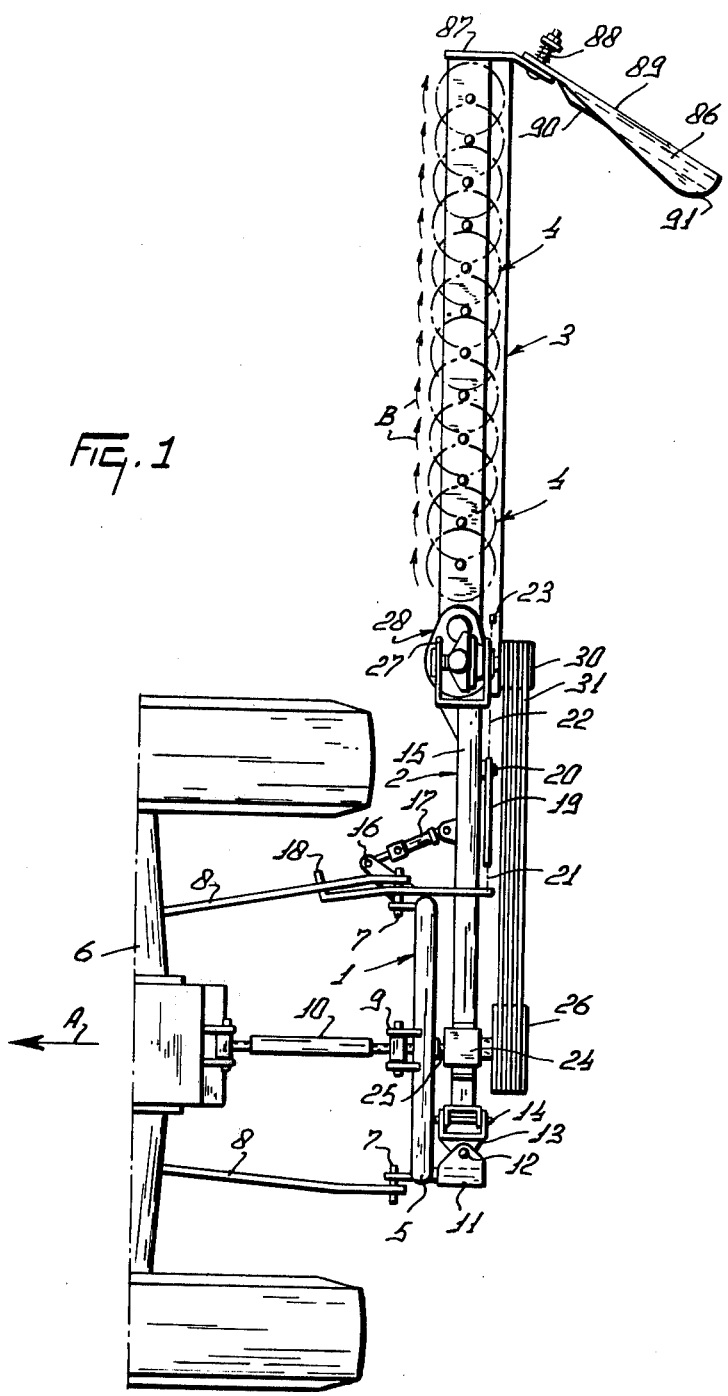
FIG. 1 is a plan view of a mowing machine in accordance with the invention connected to the rear of an agricultural tractor.

Referring to FIGS. 1 to 6 of the drawings, the mowing machine principally comprises a fastening portion 1, a supporting member 2 and a supporting beam 3 carrying a plurality of rotors 4 (FIG. 1). The fastening portion 1 is afforded principally by a coupling member or trestle 5 shaped in the form of an inverted V or U, as seen in rear elevation, the plane of symmetry of which substantially coincides, during operation, with a longitudinal plane of substantialy symmetry of a tractor 6 or other operating vehicle of the machine. Near the lower free ends of the coupling member or trestle 5 horizontal pins 7 that extend perpendicular to the intended direction of operative travel A of the machine are passed through holes provided near the hindmost ends of lower lifting arms 8 of a three-point lifting device or hitch of the tractor 6 or other vehicle whereas, near the top of the coupling member or trestle, fastening means in the form of lugs 9 can be coupled with the hindmost end of an adjustable top rod 10 of the lifting device or hitch of the tractor 6 or other vehicle. During operation, the coupling member or trestle 5, formed by a curved tubular beam, extends with its general plane substantially vertically perpendicular to the direction A. However, this position may be varied because the length of the top rod 10 is adjustable. Near one of the lower free ends of the coupling member or trestle 5, a fork 11 is fastened behind said trestle, viewed in the direction of travel A, said fork 11 comprising two parallel, substantially horizontal plates spaced one above the other, each plate having a hole registering with that of the other plate, a line containing the centers of the two holes extending upwardly, in general, at a small angle to the vertical and parallel to the general plane of the coupling member or trestle 5, said line being located in a vertical plane that is parallel to the direction A. The line in question coincides with the axis of a pivotal shaft 12, which shaft extends, during operation, almost vertically upwards from its lower end but slightly forwards with respect to the direction A. The pivotal shaft 12 is located behind the coupling member or trestle 5 and near one of the lower free ends thereof. A coupling member 13 is pivotable around the pivotal shaft 12 which member 13 serves as a bearing for a pivotal shaft 14, disposed at a short distance from the pivotal shaft 12 but arranged with its axis in non-intersecting perpendicular relationship with the axis of the pivotal shaft 12. The pivotal shaft 14 is located, viewed from the rear of the machine, between the pivotal shaft 12 and the vertical, longitudinal plane of substantial symmetry of the tractor 6 or other vehicle. The pivotal shaft 14 holds a pivotable supporting tube 15 which is connected with the coupling member or trestle 5 through the universal joint afforded by the pivotal shafts 12 and 14. From the area located at the side of said plane of substantial symmetry of the tractor or other vehicle at which the fork 11 is disposed, the supporting tube 15 extends across said plane of substantial symmetry towards the area on the other side thereof approximately up to a vertical boundary plane of the tractor 6 or other vehicle extending in the direction A remote from the fork 11 while, during operation, as viewed in plan, the supporting tube 15 is at right angles to the direction A but is inclined downwardly away from the fork 11 when the machine is viewed from the rear.

The lower free end of the coupling member or trestle 5 that is remote from the fork 11 is provided with a horizontal extension arm 16 extending forwardly in a laterally inclined position. Between the free leading end of said extension arm 16 and the supporting tube 15, there is provided a safety device 17 which prevents rearward angular displacement of the supporting member 2 during normal operation of the machine but which, in the event of a predetermined resistance to forward progress of the supporting beam 3 or the rotors 4 being exceeded, allows rearward yielding of the supporting member 2 and the supporting beam 3 to take place about the pivotal shaft 12. The safety device 17 is of a construction which is known per se. The pin 7 that is farthest from the fork 11 allows pivotal movements of a rocker 18 which is mounted thereon. The leading end of the rocker 18 is disposed, during operation, beneath the adjacent lifting arm 8, said rocker being bent upwardly in a rearward direction so that the hindmost end thereof is located at a distance above the supporting tube 15. A lever 19 is pivotable about a substantially horizontal shaft 20 extending in the direction A at the rear of the supporting tube 15, and the ends of the substantially L-shaped lever 19 are connected by bars, chains or the like 21, 22 with the rearmost end of the rocker 18 and the topmost free end of an upwardly extending lug 23 rigidly secured to the neighboring end of the supporting beam 3. The supporting tube 15 is provided with a substantially cylindrical housing 24 which comprises the bearings of a rotary input shaft 25 and which is so disposed that its horizontal axis of symmetry is located in the vertical plane of substantial symmetry of the tractor 6 or other operating vehicle. The output shaft of the housing 24 is located, as seen in plan, behind the supporting tube 15 where it is provided with a multiple pulley 26 which is arranged to revolve about an axis that is parallel to the axis of the pivotal shaft 14. The end of the supporting tube 15 which is remote from the fork 11 is provided with a fork member 27 in which a gear box 28 is pivotably journalled by means of a shaft 33 having an axis coinciding with axis 29 extending parallel to the axis of the pivotal shaft 14. The gear box 28 and the supporting beam 3 which is rigidly secured thereto are thus pivotable together about the shaft 33 with respect to the supporting tube 15 of the supporting member 2. The gear box 28 is provided at the rear with a smaller multiple pulley 30, which is constructed to match the pulley 26 and is arranged relative thereto in such a way that the grooves in the two pulleys that are intended to receive the same belt are spaced apart by equal distances from a plane at right angles to their parallel axes of rotation. In this embodiment, the pulleys 26 and 30 each have three grooves suitable for receiving co-operating V-belts 31.

The gear box 28 (FIGS. 2, 3 and 4) is pivotably journalled in the fork member 27 by means of a stub shaft 32 and shaft 33 the axes of such shafts being in alignment and both coincide with the pivotal axis 29. The pulley 30 is keyed to the rear end of the shaft 33 with respect to the direction A. The stub shaft 32 is rigidly secured in the gear box 28 and projects over a distance from the front of the box 28. The stub shaft 32 is journalled in a manner not illustrated, for example, by means of a sleeve, in a bearing plate 34 which is fastened by bolts 35 to one of the arms of the fork member 27. The shaft 33 is journalled in bearings 36 in the gear box 28, said bearings 36 being arranged in a bearing housing 37 which is secured by bolts 38 to the gear box 28. The rear of the bearing housing 37 has an arm of the fork member 27 connected to it so that relative turns are possible. In order to fix in place the rearmost bearing 36, considered in the direction A, with respect to the gear box 28, a pressure ring 39 is fastened by bolts 40 to the rear of the bearing housing 37. The shaft 33 projects from the front of the bearing housing 37 and is provided at that end with a bevel gear or pinion 42 fastened by means of splines 41 and a circlip. A shaft 43 is disposed in front of the gear 42 in the gear box 28, the axis of said shaft 43 intersecting the pivotal axis 29 at right angles and being contained in a vertical plane that is parallel to the direction A. Near its top end, the shaft 43 has splines 44 for receiving a bevel gear or pinion 45 which is in mesh with the spur gear or pinion 42. The bevel gear 45 is journalled in a bearing 46 mounted in the top of the gear box 28. The gear box 28 is closed on top by a cover plate 47 which is fastened by bolts 48 to the remainder of the gear box 28. The transmission ratio between the gears 42 and 45 is such that the shaft 43 has a considerably higher speed of revolution than does the shaft 33. Near the bottom of the gear box 28, the shaft 43 has splines 49 receiving a spur gear or pinion 50. The gear or pinion 50 and the lower end of the shaft 43 are journalled in the base of the gear box 28 by a bearing 51.

Figure 2:
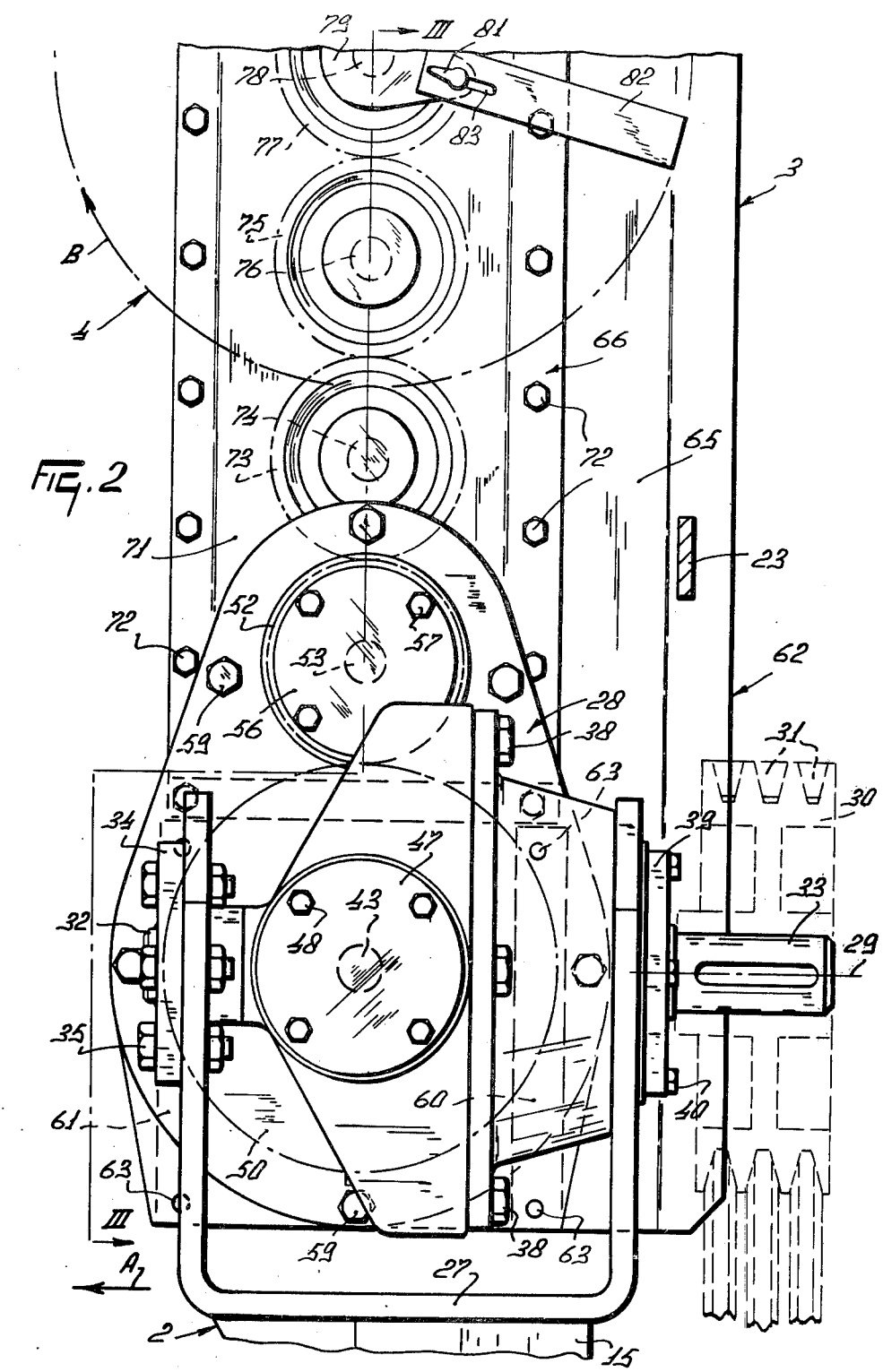
FIG. 2 is an enlarged plan view of parts of a driving gear of the machine.
Figure 3:
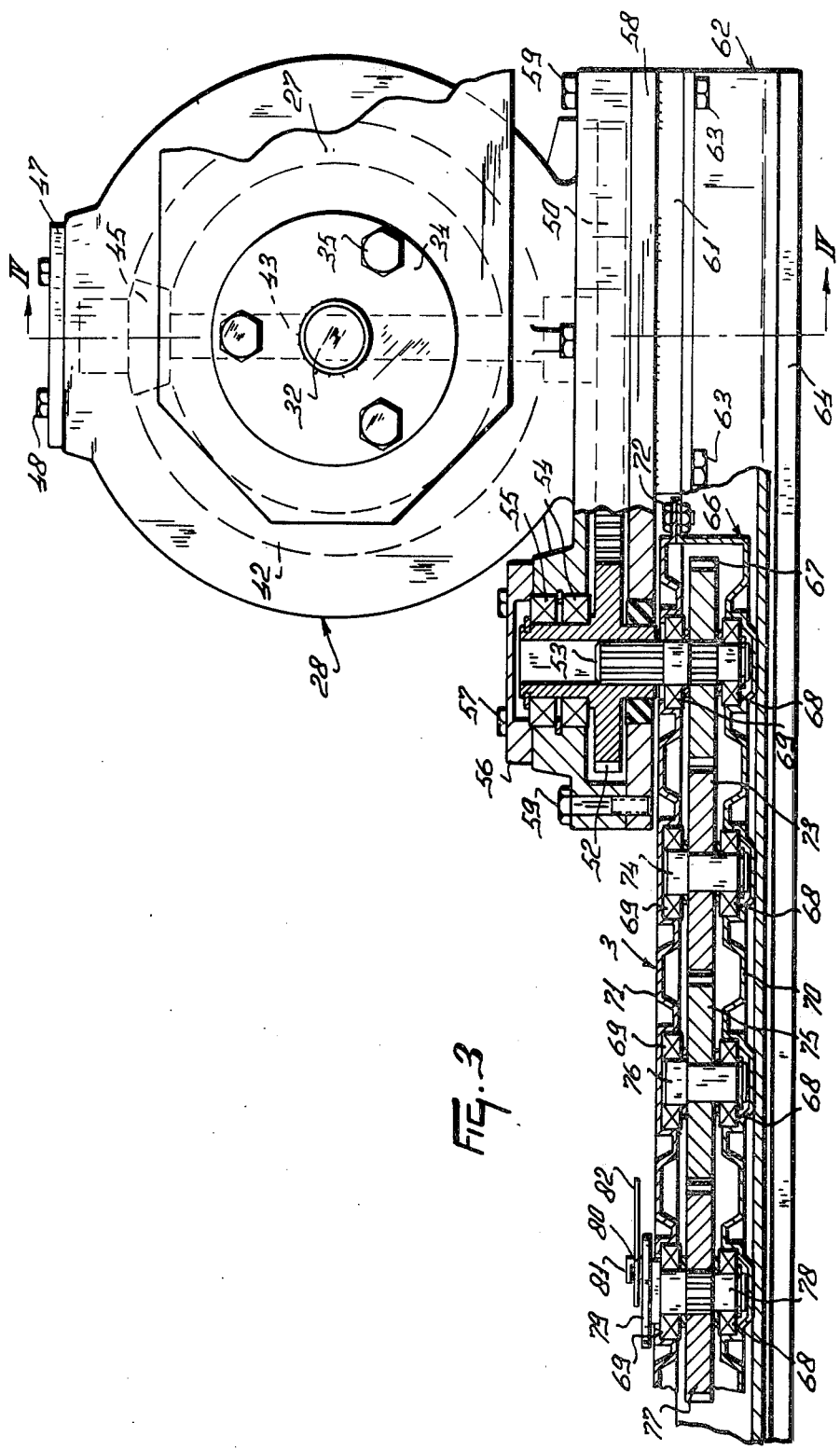
FIG. 3 is a sectional view taken along line III—III in FIG. 2.
Figure 4:
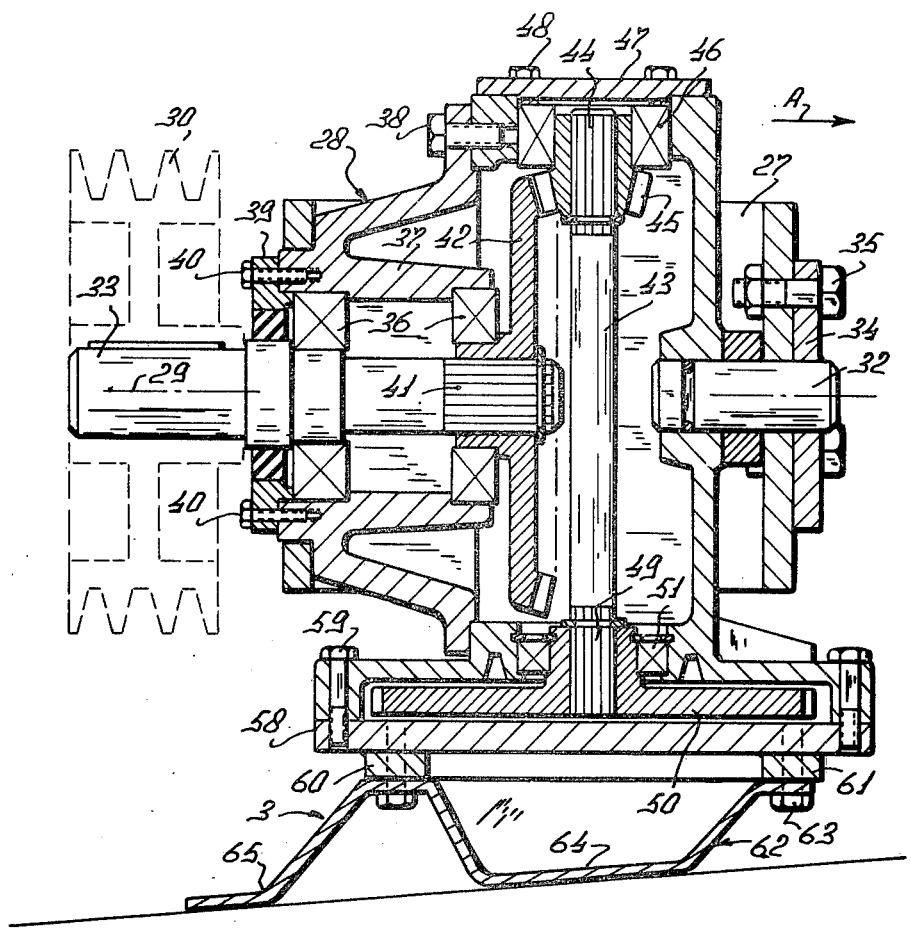
FIG. 4 is a section taken on a line IV—IV in FIG. 3.

Near its base, the gear box 28 projects horizontally towards the supporting beam 3 (FIGS. 2 and 3). Viewed in plan, the bottom of the gear box 28 (see FIG. 2) has a substantially pear-shaped form accommodating spur gear or pinion 50 which is of comparatively large diameter and that is in mesh with a smaller gear 52. The gear 52 is axially displaceable on a shaft 53 (FIG. 3), the axis of which is parallel to the axis of the shaft 43. The gear 52 is journalled in the top of the portion of the gear box 28 which projects towards the supporting beam 3 by bearings 54 and 55, the top of this portion of the gear box 28 being closed by a cover plate 56 having a circular shape, viewed in plan, which cover plate is secured to the gear box 28 by bolts 57. The gear box 28 is closed at the bottom by a plate 58 which is fastened by bolts 59 to the base of the gear box 28. The lower surface of plate 58 is provided with two supports 60 and 61 extending substantially perpendicular to the direction A.

The lower surfaces of the supports 60 and 61 have secured thereto a single mounting or support plate 62, of substantially rectangular shape when viewed in plan (FIGS. 2, 5), by bolts 63. Support plate 62 principally constitutes the supporting beam 3 and extends, viewed in plan, outwardly from the side of the gear box 28 facing the tractor 6 or other vehicle in a lateral direction over a distance of substantially two meters, the fore and aft width of the plate being about twenty centimeters. In a sectional view (FIG. 4), support plate 62 has a substantially gutter- or channel-shaped portion 64. The overall width of the channel-section portion 64 is about fifteen centimeters. The ground-contacting portion of support plate 62 that is afforded by the bottom of the portion 64 extends rectilinearly and horizontally over a predetermined distance and, at the front, support plate 62 is bent upwardly at an angle of about 45°, while portions at the edges of the limbs of the channel-section portion 64 are bent so that they are located in the same plane which is at an angle of about 5° to the horizontal, said angle being, however, adjustable with the aid of the aforementioned top rod 10. The coplanar portions of the top surface of support plate 62 are secured to the supports 60 and 61 so that the shaft 43 and the parallel shafts are at an adjustable angle of about 85° to the horizontal. Behind its rearmost, upper portion, support plate 62 extends downwardly at an angle of about 50° to the horizontal and the extreme rearmost lower portion of support plate 62 constitutes a stabilizing portion 65 which slides along the ground during operation. The channel-section portion 64 of the plate 62 receives a driving gear assembly or transmission in the form of a gear box 66 covering substantially the whole length of the plate 62 and serving to enclose the drive to the rotors 4, while it completely covers the plate 62. At the end facing the tractor 6 or other vehicle the gear box 66 comprises a spur gear 67 which is rigidly secured to the shaft 53 and which, near the lower end thereof, is supported in bearings 68 and 69 in the gear box 66. In order to ensure an effective support for the bearings 68 and 69, the gear box 66 is provided with a profiled lower portion 70 and with a profiled top portion 71 matching the bearing 69, said portions 70 and 71 being fastened to one another by bolts 72 on either side of the channel-section portion 64 of support plate 62. The gear box 66 is secured in place on support plate 62 with the aid of the same bolts 72. The level of the substantially straight upper rim of the mounting plate 62 is preferably chosen so that the top of each gear inside the gear box 66 does not project above said rim. It should be noted that the gear box 28 can be joined to the lower portion 70 of the gear box 66 in a simple manner. Since the shaft 53 is preferably displaceable with respect to the gear 52, these two portions of the machine can be disconnected from one another after releasing the bolts 63.

As seen in the sectional view of FIG. 3, the gear 67 meshes with a spur gear 73 disposed in the gear box 66 on a shaft 74 which is rotatably supported, like the shaft 53, in a bearing 69 in the top portion 71 of the gear box and in a bearing 68 in the lower portion 70 thereof. Like the gear 73, a spur gear 75 meshing with the former is fastened to a shaft 76, which shaft 76 is supported in bearings 68 and 69 in the gear box 66.

The gear 75 is drivably connected with a spur gear 77 fastened to a shaft 78, which shaft 78 is journalled in bearings 68 and 69 in the lower and top portions 70 and 71 respectively of the gear box 66. The shaft 78 extends, as seen in FIG. 3, upwardly to a location above the gear box 66. The axes of the shafts 78, 76, 74 are parallel to the axis of the shaft 53 and hence of the shaft 43. During operation, the shaft 78 is thus slightly inclined to the front, its axis being at an angle of substantially 5° to the vertical in a plane parallel to the direction A. The shaft 78 is provided with a plate-shaped hub or supporting member 79 arranged to rotate in the direction of arrow B and principally forming one of the rotors 4 of the mowing machine, said rotor 4 having, viewed in plan (FIG. 5), a substantially pear-shaped or keyhole-shaped form, the broader part surrounding the shaft 78. Near the comparatively narrow tip of the hub 79 of the rotor 4 that is farthest from the shaft 78 a cam or pin 80 is provided which has, at its top, a wide end portion 81 extending parallel to the hub 79 and over a distance in the direction of the shaft 78. Pin 80 is arranged at such a place on the hub 79 that, considered in the direction A, the path described by pin 80 is located wholly behind the front of the support plate 62. Pin 80 is a fastening member for a cutting member or blade 82 and, owing to the pivotal joint, pin 80 also forms a pivotal shaft. The cutting member or blade 82 is made from sheet material having a thickness of one to one and one-half millimeters, preferably spring steel, which may be hardened at the cutting edges with regard to the cutting function.

For connection to pin 80, the light-weight cutting member or blade 82 has a small slot shaped so that the cutting member 82 can be slipped downwardly over the wide end portion 81 of pin 80 after which it can be moved into a working position by turning it through about 180°. Thus pin 80 and the portion 81, together with the slot 83, constitute a so-called bayonet joint. The cutting member or blade 82 has a length of about ten centimeters and extends away from the axis of pin 80 to the leading edge of the gear box 66, which is straight as viewed in plan, and over a distance forwardly beyond said edge. Said length is not less than the distance between the center line of the shaft 78 and pin 80. Thus the cutting member or blade 82 is freely pivotable with respect to the rest of the rotor 4 and can be readily mounted on the hub 70. In order to ensure effective use of the cutting member or blade 82, it may have, near the end thereof remote from pin 80, a further slot so that, after its leading cutting edge is blunted, it can again be used in a position turned through 180° in which it presents a fresh sharp cutting edge to material that is to be mown.

The gear 77 is drivingly in mesh with a cylindrical gear 84 arranged in the gear box 66 on a shaft 85 which is journalled, like the shafts 76 and 74, in the lower and top portions of the gear box 66. The spur gear 84, serves as an intermediate gear between the gear 77 and the like gear 77 of a neighboring rotor hub 79, said gear 77 being furthermore drivingly in mesh with a further gear 84, said sequence of gears 77 and intermediate gears 84 being repeated to cover the whole working width of the mowing machine. The neighboring rotor hubs 79 are provided in the same manner with cutting members or blades 82. Owing to the intermediate gears 84 between the gears 77, the rotors 4 of the mowing machine will all rotate in the same directions that are indicated by the arrows B. It should be noted that, viewed in plan, neighboring rotor hubs 79 (FIG. 5) are disposed relative to one another so that vertical planes of symmetry of neighboring cutting members or blades 82 are at acute angles of about 35° to 60°, preferably substantially 48° to 50° to one another. Owing to said angles, the neighboring cutting members or blades 82 are staggered and have a predetermined phase difference during use which avoids jerky operation.

In the gear box 66 in the supporting beam 3, supported from the mounting plate 62, twelve gears 77 holding twelve rotor hubs 79 are fastened in the manner described above, said gears 77 being drivably in mesh via the intermediate gears 84, while the cutting members or blades 82 of the successive rotors 4 are at acute angles to one another as stated above.

Figure 5:
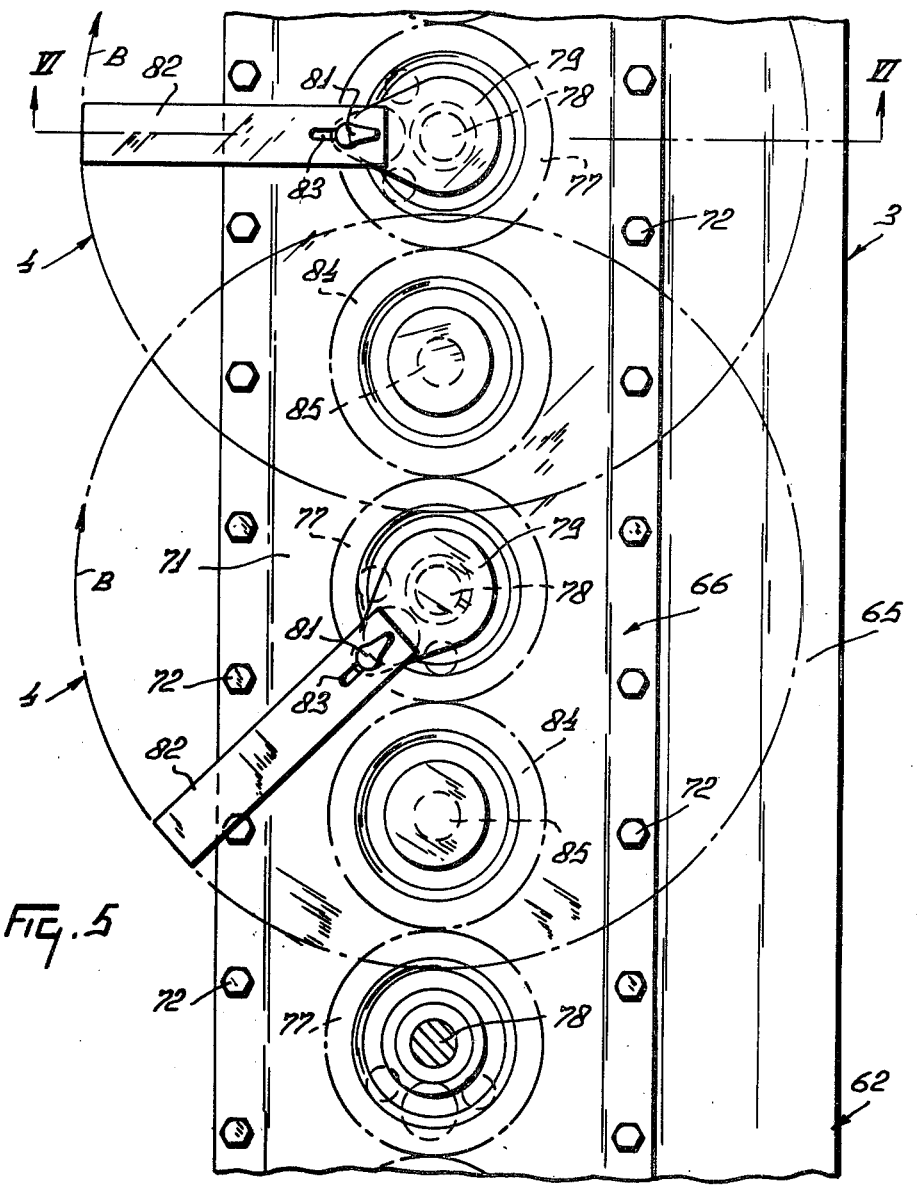
FIG. 5 is a plan view, to an enlarged scale, of parts of the mowing machine of FIG. 1.
Figure 6:
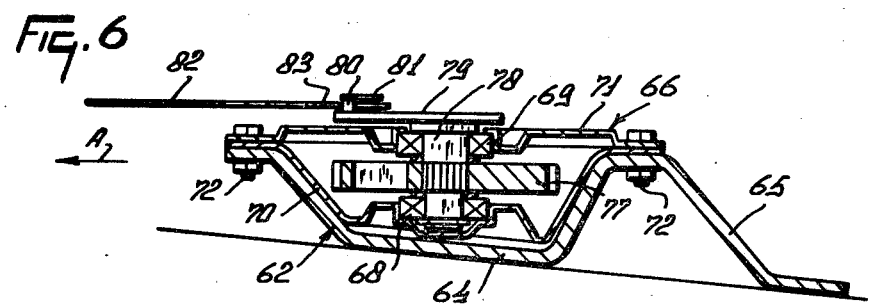
FIG. 6 is a section taken on a line VI—VI in FIG. 5.

Despite the comparatively small weight of each cutting member or blade 82, which has a volume of substantially two cubic centimeters for a thickness of about one millimeter and a length of ten centimeters, it may be advantageous to balance the rotors 4. In order to obtain such a distribution of the weight of each rotor 4 and of its associated cutting member or blade 82 that the rotor and its cutting member or blade are at least substantially rotationally balanced, it is preferred to remove a quantity of material from the portion of each gear 77 that is located beneath pin 80 of the rotor 4 concerned (FIGS. 5 and 6). As a matter of course, balancing may also be ensured on each rotor hub 79 itself, for example, by arranging small weights on the side of the hub 79 remote from pin 80. The same applies to the side of the corresponding gear 77 that is remote from the cam 80.

The cutting length of each blade 82 is such that neighboring blades 82 have the maximum potential overlap. The transmission ratio between gears 42, 45, 50, 52 is such that the rotors 4 are driven with very high speed. On the basis of the speed of revolution of the power take-off shaft of the tractor 6 or other vehicle connected with the shaft 25 of 540 revs./min., the rotors 4 are driven at the rate of 6000 revs./min. By choosing a different transmission ratio in the housing 24 and/or in the gear box 28, the rotors 4 of the mowing machine embodying the invention can be driven at a rate of 8000 to 10,000 revs./min. On the basis of a diameter of the paths described by the outer ends of the cutting members or blades 82 of about twenty-five centimeters, the cutting speed of the blades 82 amounts to about 75 ms./sec. at the rate of 6000 revs./min. With 8000 rev./min. said cutting speed is about 100 ms./sec. and with 10,000 rev./min. it is about 125 ms./sec. It should be noted that the blades 82 cut the crop without needing to co-operate with any further means.

The cutting length of the blades 82 is chosen to be large as compared with the sizes of the rotor hubs 79. Owing to the distance between the axes of the shafts 78 of fifteen centimeters in this embodiment and to the lengths of the cutters of about ten centimeters, a maximum overlap between neighboring mowing circles can be obtained with comparatively small rotors 4. In the plan view of FIG. 5, the maximum overlap has a value of substantially ten centimeters.

The effective working width of the machine shown in FIGS. 1 to 6 amounts to about two meters. Since all of the rotors 4 revolve in the directions of the arrows B, the crop is thrown generally laterally and in part to the rear. For guiding and deflecting this crop, a swath board 86 is fastened to the outer end of the supporting beam 3 (FIG. 1) while, with the aid of a ridge 87 extending to directly behind the rear rim of the supporting beam 3, the swath board 86 is inclined inwardly. By means of a spring structure 88 arranged on the outer rear side of the ridge 87, the swath board 86 can deflect resiliently. The swath board 86 comprises a vertical plate 89 the lower edge of which slides along the ground in operation at which place it is provided with a horizontally bent-over flange 90 extending away from the plate 89 towards the rotors 4. On the top of the plate 89, a flange 91 is disposed in a similar manner, the flange 91 also extending horizontally towards the rotors 4. The flange 91 has, viewed in plan, a substantially triangular shape, its largest width being located near the rear end of the plate 89 where it is locally larger in width than the underlying flange 90.

Figure 7:
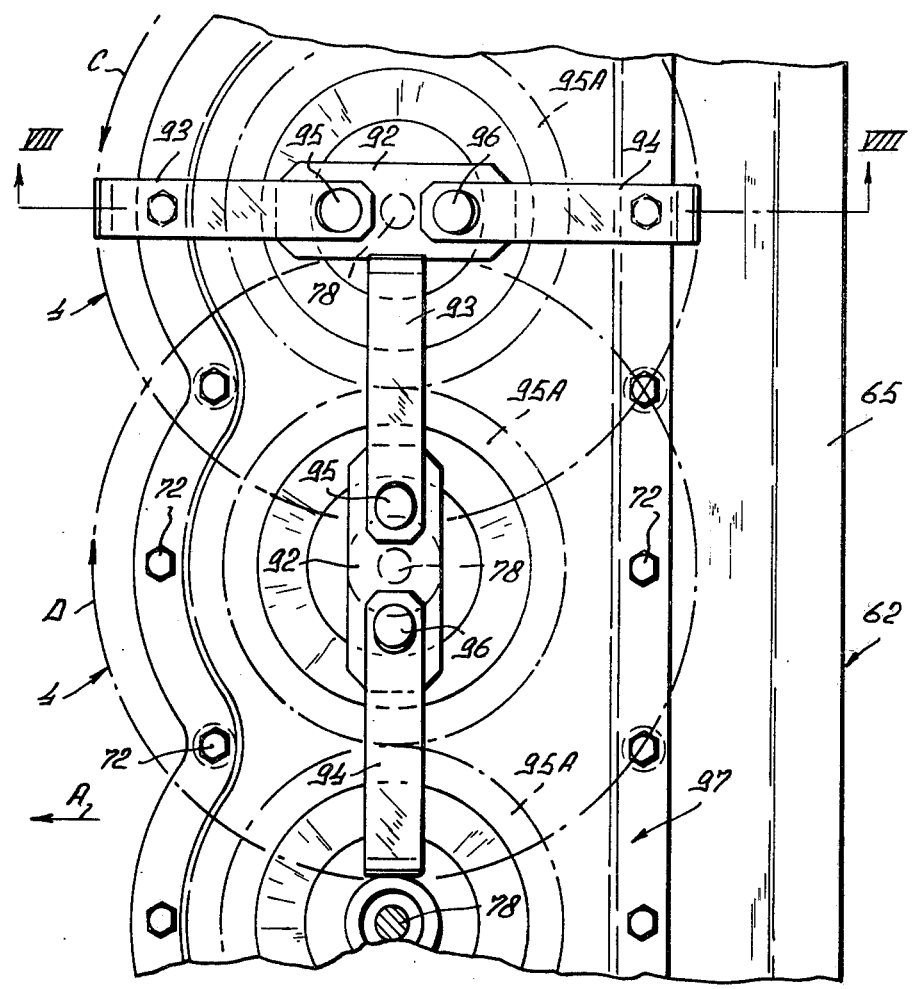
FIG. 7 is a plan view similar to FIG. 5 which illustrates a second embodiment of part of the mowing machine.
Figure 8:
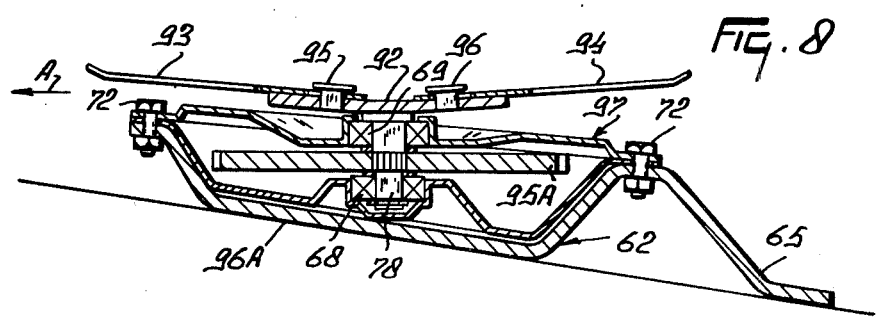
FIG. 8 is a section taken on a line VIII—VIII in FIG. 7.

In a second embodiment of the mowing machine that is shown in FIGS. 7 and 8, the gear box 97 is fastened to the top of the mounting plate 62 in a manner similar to the preceding Figures. Corresponding parts are designated by the same reference numerals. Cutting members or blades 93 and 94 are driven by means of a spur gear. Each shaft 78 is, however, provided at the top with an elongated rotor hub 92 differing from that of the preceding Figures and extending in two opposite directions away from the shaft 78. As shown in the sectional view of FIG. 8 the supporting member or hub 92 of the rotor 4 is bent slightly in an upward direction. The conical plane of the upwardly inclined edges of the rotor hub 92 defines an angle of about 5° to 10° to a plane at right angles to the shaft 78. The hub 92 of the rotor 4 serves for fastening the two blades 93 and 94 which are located diametrically opposite each other with respect to the shaft 78 and which are fastened with the aid of pins or dowels 95 and 96 to the strip-shaped hub. The blades 93 and 94, like each blade 82, are freely pivotable with respect to the remainder of the rotor 4. Since the hub 92 of the rotor 4 is bent near its free ends, the blades 93 and 94 extend outwardly so that they are also at a small angle to a plane at right angles to the shaft 78. The blades 93 and 94, like each blade 82, are preferably made from spring steel of a thickness of one to one and one-half millimeters, the length of each blade being about ten centimeters and its width being about two centimeters.

The rotor hubs 92 of the second embodiment shown in FIGS. 7 and 8 are driven with the aid of gears 95A which are successively in mesh with one another. Owing to the lack of intermediate gears in this embodiment, the rotors 4 revolve in alternate opposite directions C and D respectively. For this purpose the pairs of neighboring blades are disposed with an angular difference of about 90° (FIG. 7). The meshing gears 95A are driven by the transmission gear described with reference to the preceding Figures.

A distance between the axes of the shafts 78 of about twelve centimeters in this embodiment is chosen with regard to the paths described by the outermost tips of the blades 93 and 94 so that these paths overlap one another over a maximum distance. For this purpose the length of the blades is chosen to be as large as possible with respect to the size of the rotors 4. In this embodiment the front of the mounting place 62 is scalloped, as viewed in plan, a wave-shaped gutter or channel 96A being formed when viewed in plan. Thus, the two circular paths described by adjacent blades 93/94 can overlap one another over a still larger distance. The driving gear assembly or transmission used in this embodiment is formed by a gear box 97 constructed differently from that of the preceding embodiment since, with regard to the wave-shaped gutter or channel 96A, the front of the gear box 97, considered in the direction A, is also sinusoidal. Moreover, bolts 72 of this embodiment are alternately arranged so that only every second bolt 72 serves for interconnecting the two portions of the gear box 97, the gutter or channel 96A having, at the area of the bolt joints, holes of a diameter sufficient for the unhindered insertion of the corresponding bolts 72, whereas the first-mentioned bolts 72 have the same function as in the preceding embodiment i.e., fastening of the gear box 97 to the mounting plate 62. It should be noted that short outwardly extending free ends of the blades 93 and 94 are bent upwardly through an angle of about 30° (see FIG. 8).

Figure 11:
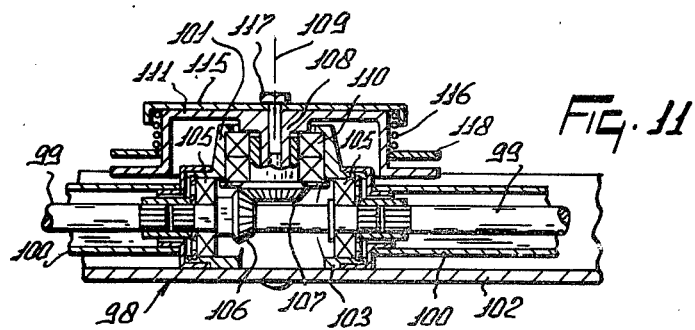
FIG. 11 is a section taken on a line XI—XI in FIG. 10.

In the third embodiment of the mowing machine that is shown in FIGS. 9, 10 and 11, the driving gear assembly or transmission is arranged on a mounting plate 98 but does not solely comprise gears. A shaft 99 is also provided which extends along the length of the supporting beam 3 and is housed in a substantially tubular cylinder 100. In this embodiment, the shaft 99 has a diameter of about ten millimeters. A gear box 101 is arranged beneath each rotor so as to be separately detachable on a gutter-shaped or channel-shaped portion 102 of the mounting plate 98 near its bottom, the mounting plate 98 thus being covered in part in portion 102 by the gear boxes 101. Each gear box 101 is provided near its bottom with an annularly curved portion 103, viewed in plan (FIG. 9), the portions 103 being secured by bolts 104 to the bottom of the mounting plate 98 at the region of the gutter-shaped or channel-shaped portion 102. The driving shaft 99 is of circular section in this embodiment and is driven in a manner that is not illustrated from the side of the gear box 28 with the aid of intermediate gears, the driving shaft 99 providing the drive to all of the rotors 4 of the mowing machine. The driving shaft 99 extends through an opening in the housing of each gear box 101 by means of a connecting spacer sleeve (FIG. 11) and is journalled in bearings 105. Inside each gear box 101, the driving shaft 99 is provided with a bevel gear or pinion 106, which may be separate from, or integral with, the shaft 99 and which is in mesh with a bevel gear or pinion 107 fastened to a rotor hub 108 having a rotary axis or center line 109 intersecting the axis of the driving shaft 99 at right angles. The axis 109 extends upwardly and occupies, during operation, the same position as the axis of one of the shafts 78 in the preceding embodiments. The rotor hub 108 is journalled in the gear box 101 by bearings 110. The bearings 110 not only support the rotor hubs 108 but they also prevent them from shifting axially in place.

Behind the gutter-shaped or channel-shaped portion 102, the mounting plate 98 comprises, as in the preceding embodiments, a stabilizing portion, which extends, however, further to the rear in this embodiment. The overall front to rear width of the mounting plate 98 in this embodiment is about twenty-five centimeters.

Above each gear box 101, the corresponding rotor hub 108 has a substantially inverted soup bowl-shaped portion 111 which is substantially perpendicular to the axis 109 and then extends downwardly over a portion of the gear box 101, the portion 111 then extending radially away from the axis 109, the latter portion being also perpendicular to the rotary axis 109. The portion 111 holds two diametrically opposite pins 112 serving as fastening points for wire-shaped cutters or blades 113 which are curved substantially in hairpin fashion, part of each cutter or blade 113 having a sharpened edge 114 ground therein. The pins 112 are located, as viewed in plan, principally to the rear of the front rim of the mounting plate 98 with respect to the direction A. The length of each cutting member, cutter or blade 113 is not less than the distance between one of the pins 112 and the corresponding axis 109. The rotors 4 are disposed, as in the preceding embodiment of FIG. 7, with a relative phase difference of about 90°. Considered in the direction A, the front of the mounting plate 98 is, like in the embodiment of FIG. 7, formed in the shape of a wave so that the paths described by the outer free ends of the blades 113 which rotate in pairs in opposite directions C and D can overlap one another over a considerable distance. The maximum value of this overlap is, in this embodiment, about four centimeters, while the distance between the axes 109 of neighboring rotors 4 is about sixteen centimeters. The overall diameter of the path described by the ends of each pair of blades 113 is, in this embodiment, about twenty centimeters.

The cutting members, cutters or blades 113 can be secured to the rotor hubs 108 by means of quickly engageable and releasable connections. Each such connections comprises a pressure plate 115 that compresses a helical spring 116 coaxially surrounding the rotor hub 108 and that is fixed by a central bolt 117 to the rotor hub 108 concerned. The connection can be slipped upwardly along the rotor hub 108 for removing the cutting members or blades 113. The spring 116 prevents the cutting members or blades 113 from snapping off the pins 112 during operation, a retaining ring 117A being arranged between the spring 116 and the cutting members or blades 113.

In order to obtain a satisfactory closure of the space beneath the rotor hub 108, two sealing means in the form of ridges 118 are provided on either side of the gear box 101. These ridges 118 and the gear boxes 101 are preferably cast as an integral unit.

Figure 12:
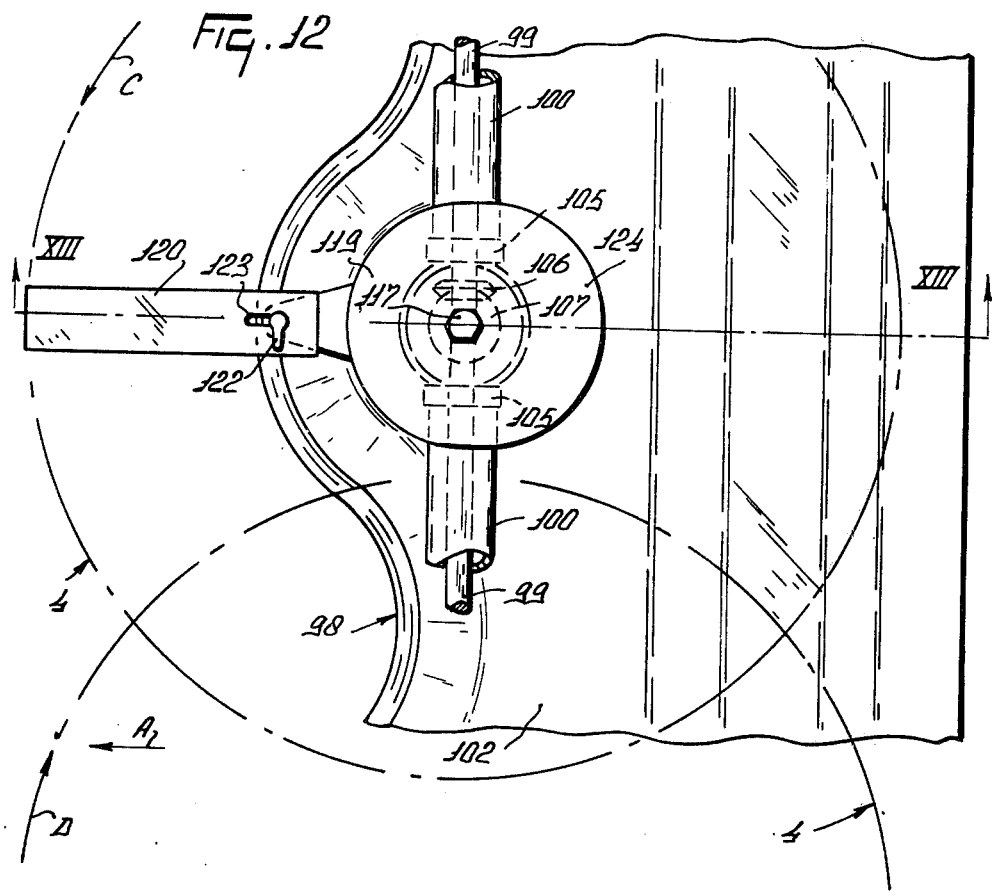
FIG. 12 is a plan view, similar to FIGS. 5, 7 and 9, which illustrates a fourth embodiment of part of the mowing machine.
Figure 13:
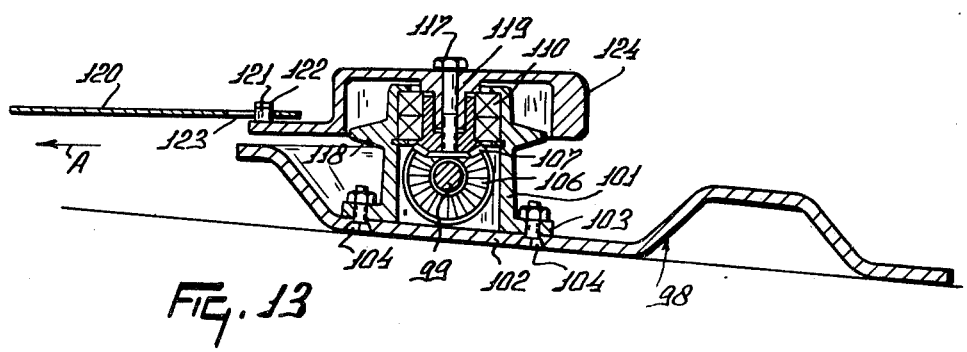
FIG. 13 is a section taken on a line XIII—XIII in FIG. 12.

In a fourth embodiment of the mowing machine shown in FIGS. 12 and 13 corresponding parts are designated by the same reference numerals. The bolts 104 have capshaped heads which, in the embodiment of FIGS. 9 to 11, project from the bottom of the mounting plate 98. However, in this embodiment, bolts 104 are countersunk into the mounting plate 98. In this embodiment, each gear or pinion 107 drives a rotor hub 119 which is generally similar to one of the rotor hubs 108 but which is constructed to receive only one cutting member or blade 120 that is substantially similar to one of the cutting members or blades 82. Each cutting member or blade 120 is connected to the rotor hub 119 with the aid of a pin 121 which has, near its top, a widened portion 122 for mounting of the blade. In this embodiment, the widened portion 122 extends in a tangential direction with respect to the axis of the rotor 4 so that a bayonet joint is formed for the blade, which blade 120 is turned through 90° during installation or removal. The blade 120 has, for this purpose, a corresponding slot-shaped opening 123 serving the same purpose as the opening 83 in FIG. 5. In order to avoid the rotor 4 having an eccentric center of gravity when provided with its blade 120, balancing means are arranged on the hub 119 diametrically opposite to the pin 121 at the side of the hub 119 remote from the blade, said means preferably being afforded by a weight 124. This weight 124 can be provided in a simple manner by casting it integrally with the rotor hub 119.

In the fifth embodiment shown in FIGS. 14 and 15, the drive transmission is again provided by employing a shaft extending along the length of the supporting beam 3 as in the preceding two embodiments. The driving gear assembly or transmission comprises a gear box 125 holding the bevel gears or pinions 106 and 107. The gear box 125 is secured above the bottom of a mounting plate 126, which it locally covers. The plate 126 is an integral unit, as in the preceding embodiments, and comprises a gutter-shaped or channel-shaped portion 127 in the area where the gear box 125 is fastened and a guide portion 128 joining the former and extending to the rear with respect to the direction A in substantially parallel relationship with the horizontal.

As in the two preceding embodiments, the bevel gear or pinion 107 is provided with a rotor hub 129 which surrounds the top of the gear box 125. The hub 129 has a rim 130 having two pins or dowels 131. This construction is substantially similar to that of the embodiment described with reference to FIGS. 9 to 11. The pins or dowels 131 are disposed diametrically opposite one another on the rotor hub 129 and are provided with cutting members or blades 132, preferably of wire-shaped form like the cutting members or blades 113 and having similar sharpened cutting edges. Two neighboring rotors 4 are preferably arranged so that, as in the embodiment shown in FIG. 9, a phase difference of 90° is obtained. The outer free ends of the cutting members or blades 132 describe paths which overlap one another over a considerable distance. In this embodiment, the maximum extent of said overlap is about eight centimeters and the distance between the axes of the rotor hubs 129 is about twenty centimeters. The diameter of the path described by the ends of the cutting members or blades 132 of each pair is about twenty centimeters.

Like the rotor hubs 108 and 119, the rotor hubs 129 are provided with quickly engageable and releasable connections formed by covers 133, each of which covers 133, by means of a helical spring 134 and rings 135 on the pins or dowels 131, prevents the cutting members or blades 132 from shifting upwardly along the pins or dowels. Each cover 133 is secured by a bolt 136 to the rotor hub 129 concerned. The cover 133 is preferably formed so as to extend in a slightly concave shape in a downward direction.

With regard to the large overlap between the cutting members or blades 132, the front of the mounting plate 126, considered in the direction A, is straight as seen in plan. The horizontal or substantially horizontal portion 128 extends to the rear, with respect to the direction A, just beyond the paths described by the outer ends of the rotating cutting members or blades 132. From FIG. 15 it will be apparent that the gear box 125 has a double set of ridges 137 that are located opposite one another as in some of the preceding embodiments (ridges 118) in order substantially to close the space beneath the rotor hub 129.

Figure 16:
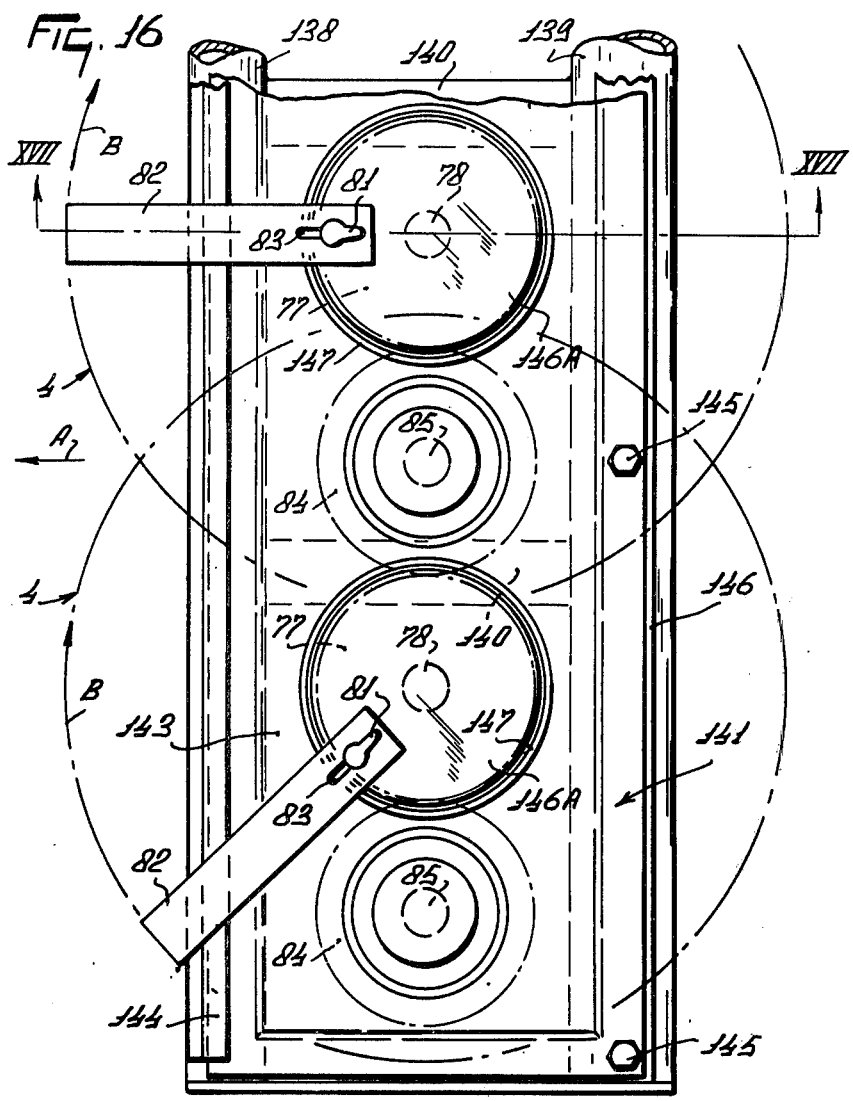
FIG. 16 is a plan view, similar to FIGS. 5, 7, 9, 12 and 14, which illustrates a sixth embodiment of part of the mowing machine.
Figure 17:
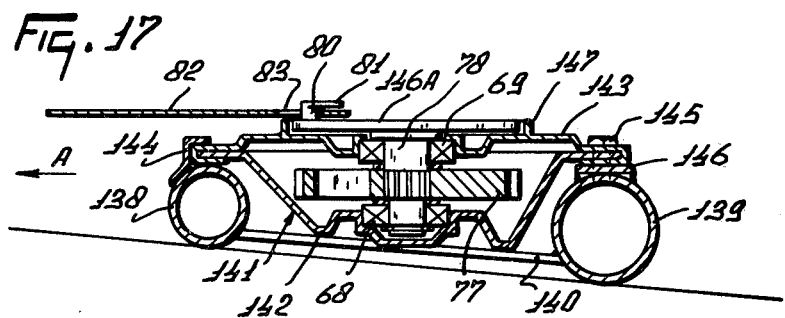
FIG. 17 is a section taken on a line XVII—XVII in FIG. 16.

In the sixth embodiment of a mowing machine in accordance with the invention that is illustrated in FIGS. 16 and 17, the support plate 62 of the first embodiment is replaced by tubular supporting portions 138 and 139. The portion 138 is preferably formed by a tube covering the whole working width of the mowing machine. As compared with the tubular portion 139 which also covers the whole working width of the mowing machine, said portion 138 preferably has a diameter which is slightly less than 70% of the diameter of the tubular portion 139. The tubes 139 and 138 are interconnected near the bottom by equally spaced transverse portions 140. Between the tubes 138 and 139 there is arranged a driving gear assembly or transmission comprising a gear box 141 which substantially corresponds to the gear box 66 of the first embodiment. Said gear box 141 comprises a lower portion 142 and a top portion 143. The gear box 141 of this embodiment is completely closed. For this purpose the top portion 143 is bent near its rim around the portion 142. The gear box 141 is, therefore, mounted as a single unit and can, if necessary, be replaced as a single unit. In order to permit ready mounting of the gear box 141, the top of the tube 138 is provided with an angle-section iron or steel bar 144 by welding, which bar embraces the foremost rim of the gear box 141 with respect to the direction A. The gear box 141 is secured to the tube 139 in a conventional manner, as shown in the first embodiment, by bolts 145. In order to ensure satisfactory mounting, the tube 139 is provided on top with a flat strip 146 on which the rim of the gear box 141 can be arranged in a simple manner. The gear box 141 accommodates a driving mechanism substantially corresponding with the driving mechanism of the first embodiment. Corresponding parts are designated by the same numerals.

The top of each shaft 78 is provided with a rotor hub 146A and the neighboring rotors 4 have the same direction of rotation indicated by the arrow B owing to the use of the intermediate gear wheels 84. Each rotor hub 146A, which is preferably flat and circular as seen in plan, is provided at a point near its circumference with one of the previously described pins 80 and with a widened portion 81. The cutting member or blade 82 is connected thereto in the same manner as for the first embodiment. As in the first embodiment, the gear wheel 77 located beneath each blade 82 also has one or more bores ensuring the balance of the assembly of blade and rotor hub during operation. In order to prevent grass cuttings or any foreign material or both from getting in between each rotor hub a and the gear box 141, the rotor hubs a are each concentrically surrounded by an upright rim 147 extending, preferably, to just beneath the corresponding cutting member or blade 82.

Although certain features of the mowing machines described and illustrated in the accompanying drawings will be set forth in the following claims as inventive features, it is that the invention is not necessarily limited to those features and includes within its scope each of the parts of each mowing machine that has been described or illustrated in the accompanying drawings or both, individually and in various combinations.

Having thus described my invention what I claim as new and desire to secure by Letters Patent of the United States is:

1. A mowing machine comprising a frame with coupling means and elongated supporting means extending laterally of said coupling means, a plurality of cutting rotors mounted along the length of said supporting means and driving means connected to rotate said rotors about corresponding upwardly extending axes, said supporting means including an elongated ground engaging plate that mounts said rotors and is a base plate therefor and further mounts said driving means, said mounting plate being configured to slide over the ground and having a forward portion and a lower channel section, said forward portion extending upwardly from said lower channel section, with respect to the normal direction of travel, said driving means including at least one respective gear and a gear box containing said gear, said gear box being housed, at least in part, in said channel section and being readily removable and replaceable as a unit relative to said plate.

2. A mowing machine as claimed in claim 1, wherein said plate is a single integral structure.

3. A mowing machine as claimed in claim 2, wherein the gear box has sealing means.

4. A mowing machine as claimed in claim 3, wherein the gear box is completely enclosed.

5. A mowing machine as claimed in claim 1, wherein, as seen in plan view, said rotors include hubs and cutting members connected to said hubs at points located rearwardly of the front of said plate.

6. A mowing machine as claimed in claim 5, wherein, as seen in plan view, said plate has a substantially straight leading edge, and the connection points of the cutting members to the hubs of the respective rotors are pivots.

7. A mowing machine as claimed in claim 1, wherein said plate is a profiled metal structure, as seen in cross-section.

8. A mowing machine as claimed in claim 7, wherein the front of said plate is inclined upwardly.

9. A mowing machine as claimed in claim 8, wherein the rear of said plate is also inclined upwardly.

10. A mowing machine as claimed in claim 9, wherein the cross-sectional shape of the plate is gutter-shaped and said channel section is located between portions that are inclined upwardly.

11. A mowing machine as claimed in claim 8, wherein the rear of the mounting plate is inclined downwardly.

12. A mowing machine as claimed in claim 7, wherein said plate is first inclined upwardly to the rear of the channel-section and is then inclined downwardly.

13. A mowing machine as claimed in claim 12, wherein the rearmost portion of said plate is substantially horizontal and bears on the ground as a stabilising portion.

14. A mowing machine as claimed in claim 1, wherein each rotor is supported by three shaped plate parts including said channel section arranged in superposed relationship.

15. A mowing machine comprising a frame with coupling means and elongated supporting means extending laterally of said coupling means, a plurality of cutting rotors mounted along the length of said supporting means and driving means connected to rotate said rotors about corresponding upwardly extending axes, said supporting means including an elongated ground engaging portion that supports said rotors and driving means, each said rotor including at least one cutter member mounted on pivot means and at least one said rotor being mounted on an upwardly extending shaft that is housed within a gear box, said gear box having a front and a rear that are connected to said support means with respect to the direction of travel, said gear box being readily removable and replaceable as a unit from said support means, said supporting means, including the portion with rotors, being pivoted to the remainder of the frame to match ground irregularities during travel.

16. A mowing machine as claimed in claim 15, wherein each cutting rotor includes a hub, each said cutting member being connected to said hub and freely pivotable with respect to said hub.

17. A mowing machine as claimed in claim 16, wherein the cutting members of two neighboring rotors machine occupy different angular settings about their respective shafts.

18. A mowing machine as claimed in claim 17, wherein said angular settings differ by an angle of about 50°.

19. A mowing machine as claimed in claim 16, wherein each said rotor has only at least one blade.

20. A mowing machine as claimed in claim 16, wherein each said cutting member is a spring steel plate having a thickness of one millimeter.

21. A mowing machine as claimed in claim 16, wherein each said cutting member is a blade with an elongated slot-like opening and pivot means passes through said opening.

22. A mowing machine as claimed in claim 21, wherein each said rotor has a hub and said hub has at least one connection means that is shaped to co-operate with an elongated opening in said blade.

23. A mowing machine as claimed in claim 22, wherein said elongated opening and said connection means co-operate and comprise a bayonet joint fastening.

24. A mowing machine as claimed in claim 16, wherein said hub of each said rotor is a shaped plate.

25. A mowing machine as claimed in claim 16, wherein the axis about which each said cutting member pivotable is located adjacent the axis of rotation of the corresponding said rotor.

26. A mowing machine as claimed in claim 25, wherein the length of each said pivotable cutting member measured from its pivotable cutting member measured from its pivotal axis to the free end of that member is not less than the distance between said pivotal axis and said axis of rotation of the corresponding rotor.

27. A mowing machine comprising a frame with coupling means and elongated supporting means extending laterally of said coupling means, a plurality of cutting rotors mounted along the length of said supporting means and driving means connected to rotate said rotors about corresponding upwardly extending axes, said supporting means including an elongated ground engaging portion that supports said rotors and said driving means, each said rotor including at least one cutter member on a hub of said rotor and said hub being connected to upwardly extending shaft means that defines the axis of rotation of the respective rotor, said cutting member being a blade that is freely pivoted to said hub, the length of said blade from its pivot connection being not less than the distance from that connection to said axis of rotation.

28. A mowing maching as claimed in claim 27, wherein each said blade has a length of about ten centimeters and the distance between the axes of rotation of adjacent said rotors is about fifteen centimeters.

29. A mowing machine as claimed in claim 28, wherein said blade has a volume of not more than three cubic centimeters.

30. A mowing machine as claimed in claim 27, wherein said blade is mounted on said hub with a quickly releasable joint.

31. A mowing machine as claimed in claim 27, wherein said coupling means is a trestle having multiple points for connection to the lifting device of a tractor.

32. A mowing machine as claimed in claim 27, wherein said rotors are driven by a transmission which comprises said gears mounted along the length of said ground engaging portion within a channel section thereof.

33. A mowing machine as claimed in claim 32, wherein the transmission to the rotors is afforded by meshed toothed gear on respective shafts, each said rotor being connected to revolve at a speed of not less than about 6000 r.p.m..

34. A mowing machine comprising a frame with coupling means and elongated supporting means extending laterally of said coupling means, a plurality of cutting rotors mounted along the length of said supporting means and driving means connected to rotate said rotors about corresponding upwardly extending axes, said driving means including an elongated ground engaging plate that mounts the rotors and driving means, said plate being configured to slide over the ground and having a central channel section that receives said driving means, said driving means comprising a transmission from p.t.o. of the prime mover connected to said coupling means and each rotor having a respective gear on a corresponding shaft that defines the rotor's axis of rotation, each rotor having at least one blade pivoted on a hub secured to the corresponding shaft above said gear, said blade being revolved by the driving means at a speed of at least 6000 r.p.m..

35. A mowing machine as claimed in claim 34, wherein the speed of rotation of each said rotor is between about 8000 and 10,000 r.p.m..

36. A mowing machine as claimed in claim 35, wherein an intermediate gear is drivably positioned between the gears of any two neighboring rotors, said gears being positioned so that said rotors revolve in the same direction.

37. A mowing machine as claimed in claim 34, wherein each respective gear, blade and hub comprise an assembly and the center of gravity of said assembly is substantially balanced on the axis of rotation of the respective rotor.

38. A mowing machine as claimed in claim 37, wherein at least one hole is formed for balancing purposes in said gear.

39. A mowing machine comprising a frame with coupling means and elongated supporting means extending laterally of said coupling means, a plurality of cutting rotors mounted along the length of said supporting means and driving means connected to rotate said rotors about corresponding upwardly extending axes, said supporting means including an elongated ground engaging plate that mounts the rotors and driving means, said plate being configured to slide over the ground and having a channel section that receives an enclosed elongated gear box and said driving means including at least one respective gear located within said gear box for each rotor, said gear being fixed to upwardly extending shaft means that defines the axis of rotation of said rotor, at least one blade pivoted to said rotor to freely turn about an upwardly extending pivot axis a substantial distance from the axis of rotation.

40. A mowing machine as claimed in claim 39, the machine having a working width of substantially two meters and the outer lateral end of said plate having a ridge that rides on the ground.

41. A mowing machine as claimed in claim 40, wherein the width of the channel section of said mounting plate is about equal to the distance between the axes of rotation of two neighboring rotors.

* * * * *